United States Patent [19]
Wroblewski et al.

[11] 3,772,548
[45] Nov. 13, 1973

[54] WHEEL SPEED SENSOR

[75] Inventors: Richard C. Wroblewski, Warren; Charles G. Wright, Detroit, both of Mich.

[73] Assignee: Rockwell International Corporation, Pittsburgh, Pa.

[22] Filed: June 30, 1972

[21] Appl. No.: 267,778

[52] U.S. Cl. .............................................. 310/168
[51] Int. Cl. ......................................... H02k 19/20
[58] Field of Search .................... 310/152, 155, 168, 310/169

[56] References Cited
UNITED STATES PATENTS
3,487,247  12/1969  Scheffler ........................... 310/168

Primary Examiner—D. F. Duggan
Attorney—John R. Bronaugh et al.

[57] ABSTRACT

A self-adjusting wheel speed sensor assembly including a magnetic sensor and a rotor on a vehicle axle and wheel. The sensor and rotor are automatically adjusted to a predetermined relationship as the wheel is mounted on the axle and are maintained in that relationship during operation of the vehicle. The sensor is manufactured as a self-contained modular unit and the rotor is formed by a metal stamping operation.

12 Claims, 8 Drawing Figures

PATENTED NOV 13 1973

WHEEL SPEED SENSOR

BACKGROUND OF THE INVENTION

Modern anti-skid vehicle brake control systems operate in response to electrical signals indicative of the angular velocity of one or more of the vehicle wheels. Usually these signals are derived from an electromagnetic sensor, including a magnet carried by a stationary portion of the vehicle such as the axle housing and a toothed or notched metal ring which rotates with the wheel opposite the magnet. As the ring teeth pass the magnetic sensor device, the resulting variations in flux produce a signal, the frequency of which is a function of the angular velocity of the wheel.

To produce the required accuracy of the velocity signal, the sensor and ring must be precisely located with respect to each other during assembly of the wheel on the axle, and must remain in a preselected relationship even after extended operation in which the components are subjected to road shocks and constant vibration.

It is also essential that installation of the sensor assembly be accomplished in a manner adaptable to mass production methods to minimize the need for skilled technicians and elaborate installation techniques. In addition, the velocity sensor must be protected against dirt, mechanical damage and heat.

The sensor assembly described in this application is an improvement over a prior proposal described in U.S. Pat. Application (Case Docket No. 2044) entitled "Wheel Speed Sensor," filed on June 16, 1972 by Louis M. Fiteny et al, and assigned to the assignee of this application.

SUMMARY OF THE INVENTION

Accordingly, the primary object of this invention resides in the provision of improved, self-adjusting, vehicle wheel speed sensor mechanisms in which the rotating and stationary components of the mechanisms are automaticaly adjusted to a predetermined precise relationship as the wheel is mounted on an axle and maintained in that predetermined relationship during operation of the vehicle.

Another object of the invention resides in the provision of an improved, self-adjusting wheel speed sensor mechanism which facilitates installation of the sensor components and assures that the components are positioned and maintained in proper predetermined relationship to produce an accurate velocity signal.

A further object of the invention resides in the provision of an improved, self-adjusting wheel speed sensing mechanism in which the stationary and rotating sensing components are separately mounted on an axle and a wheel, automatically adjusted to a precise predetermined relationship as the wheel is mounted on the axle, and maintained in that predetermined relationship during operation of the vehicle. Consequently, the sensing components may be quickly and easily mounted on the axle and wheel, and the wheel may be rapidly installed on the axle by unskilled technicians employing routine installation techniques.

The novel wheel speed sensing mechanism of the invention attains these and other objects by providing a stamped rotor component which rotates with the wheel, and a sensor module adjustably mounted in a protective housing which is fixed on the axle. The module is retained in the housing by a one-way clutch assembly arranged to permit movement of the module in an axially inboard direction and to lock the module against outboard axial movement or radial or circumferential displacement. As the wheel is placed on the axle a radial face of the rotor component engages the opposing radial face of the sensor component to automatically shift and adjust the sensor component axially inwardly within its housing to a precise predetermined relative operating position so that an accurate velocity signal is produced. The engaging radial face of one of the components is coated with a dielectric material which initially automatically establishes a predetermined gap between the rotor and the sensor, and this gap is maintained during operation by the one-way clutch assembly. The module mounting structure includes means for preventing inboard walking of the sensor when it is subjected to road shocks and vibrations.

DETAILED DESCRIPTION OF THE INVENTION

For present purposes the invention will be disclosed as applied to a non-steerable vehicle axle such as a trailer axle designed for heavy-duty use. As used herein and in the claims, the term "axle" is intended to refer to any stationary component on which a wheel hub is mounted and includes components commonly referred to as spindles or hollow tubular housings which accomodate drive shafts if the wheels are to be driven.

THE DRAWINGS

Figure 1:
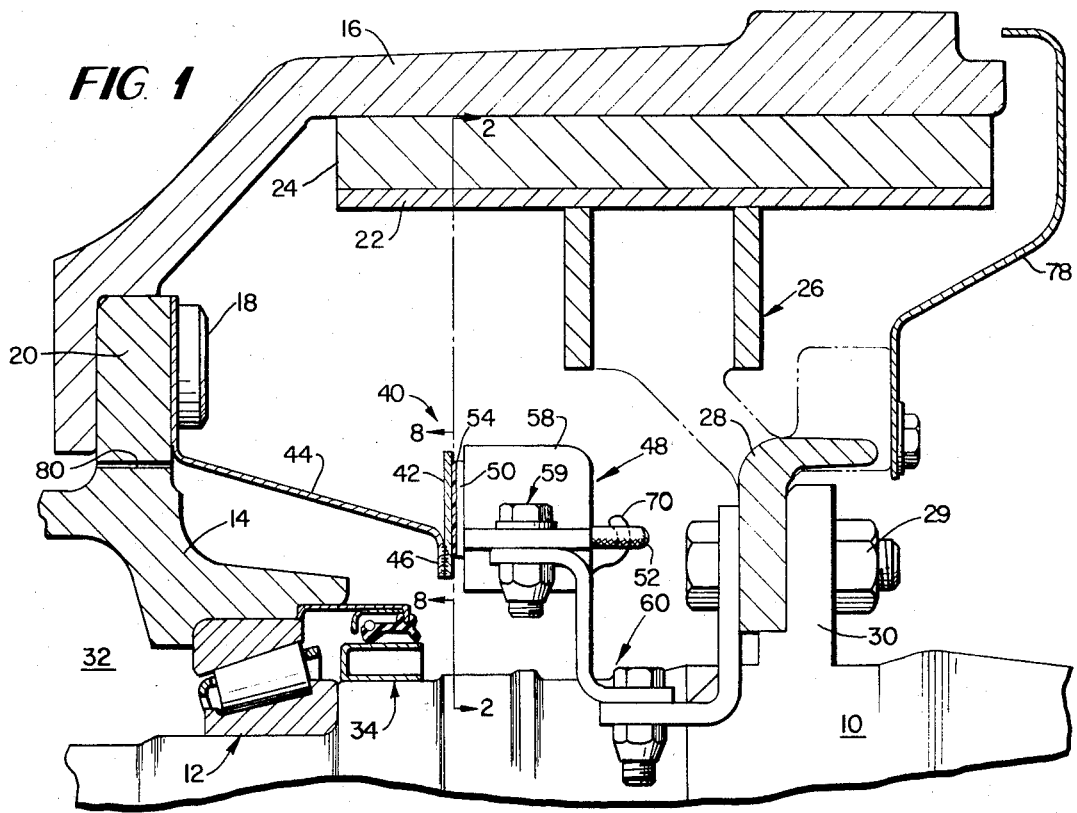
FIG. 1 is a fragmentary section illustrating a wheel speed sensor assembly constructed in accordance with the present invention and mounted for operation on a vehicle wheel and axle.
Figure 2:
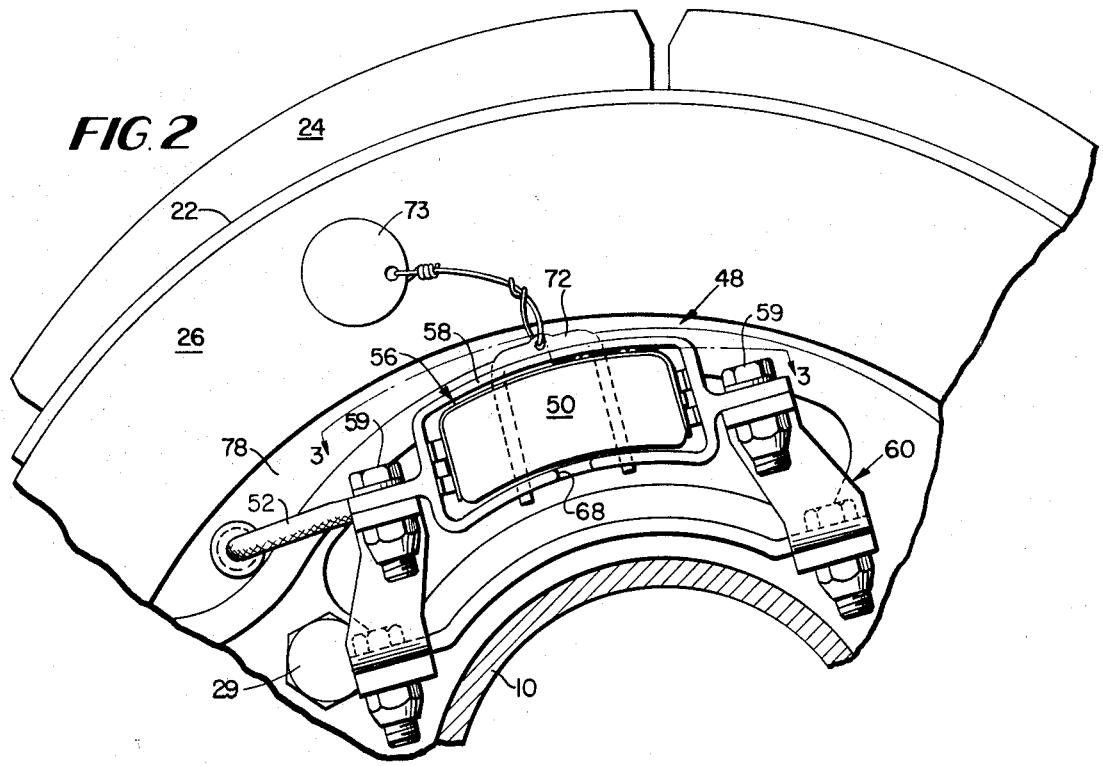
FIG. 2 is a fragmentary section taken generally along line 2—2 of FIG. 1, but illustrating the sensor module as it appears mounted on the axle before the wheel is assembled thereon.

Referring to FIGS. 1 and 2 of the drawings, axle 10 is provided at its outer end with a bearing seat for bearing assembly 12 upon which wheel hub 14 is rotatably supported in the usual fashion. Brake drum 16 is connected by a plurality of bolts 18 to a radial flange 20 of hub 14, with flange 20 also carrying a plurality of wheel mounting studs which are not shown. The brake assembly is conventional and includes brake shoes 22 carrying linings 24 and the brake operating mechanism including an actuating arm, schematically shown at 26, connected to a spider 28 secured by bolt assemblies 29 to a flange section 30 on axle 10.

Bearing assembly 12 may be provided with lubricant from a cavity 32 located adjacent its outer end, and the inner end of the assembly will be sealed by a seal unit 34 carried between hub 14 and axle 10.

Figure 8:
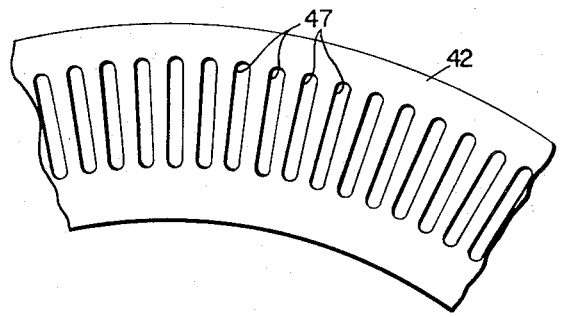
FIG. 8 is a fragmentary view of the rotor which is mounted on the wheel, taken generally along line 8—8 of FIG. 1.

The wheel speed sensor assembly 40 includes a rotor component formed by a steel ring 42 carried by a flared ring or slinger 44 secured by bolts 18 to the wheel hub flange 20. Both ring 42 and slinger 44 are conveniently formed as separate stamped metal parts, ring 42 being welded to a radial flange section 46 to form a slinger and rotor assembly ready for placement on the wheel without necessitating precise machining of ring 42. As shown in FIG. 8, ring 42 is provided with a plurality of equally circumferentially spaced surface discontinuities in the form of radial slots 47. In a typical case, ring 42 will have an O.D. of about 9.5 inches and will be provided with 120 equally spaced slots having a radial length of about 0.75 inches.

Sensing assembly 40 also comprises a stationary sensor module 48 mounted on axle 10. Module 48 includes a magnetic sensor unit 50 which is of arcuate configuration and is formed on the same radius as ring slots 47 and in a typical case may have a radial width of approximately 1 inch. Unit 50 may be of conventional construction and particularly may include a plurality of magnetic poles 51, embedded in a plastic body which also contains electrical components that convert the signals generated by the magnets to a proper form for use in the brake control system. The leads to the power supply for the sensor unit 50 as well as for the output signal are contained in a cable 52 leading into the rear of the sensor unit.

The outboard face of sensor unit 50 is coated by gap pad 54 formed of a dielectric material such as an epoxy. As described hereinafter, pad 54 establishes a predetermined axial gap or clearance between the inboard face of ring 42 and the magnet poles 51 embedded within unit 50. For example, the thickness of pad 54 may be approximately 0.060 inches corresponding to the predetermined clearance desired between the magnet poles and ring 42.

Figures 3, 4:
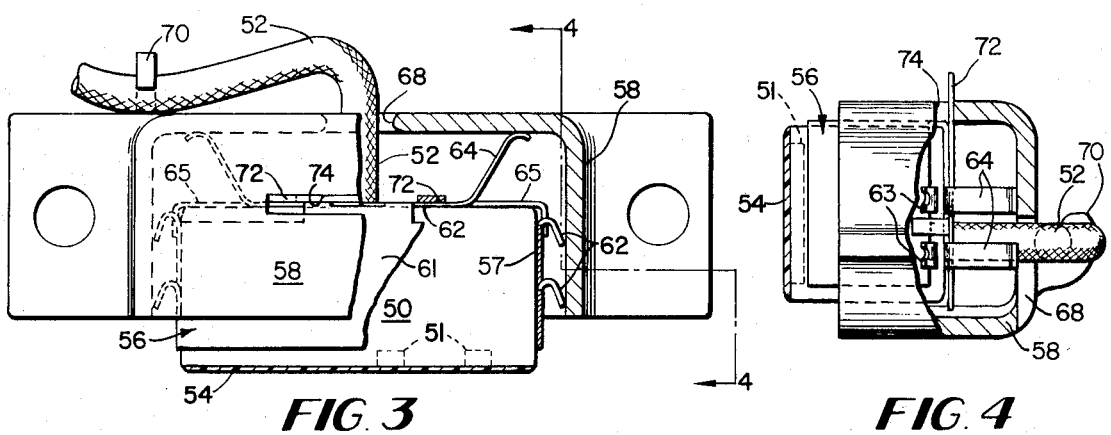
FIG. 3 is an enlarged fragmentary plan view of the sensor module taken generally along line 3—3 of FIG. 2.
FIG. 4 is a fragmentary view of the sensor module taken generally along line 4—4 of FIG. 3.
Figures 5, 6:
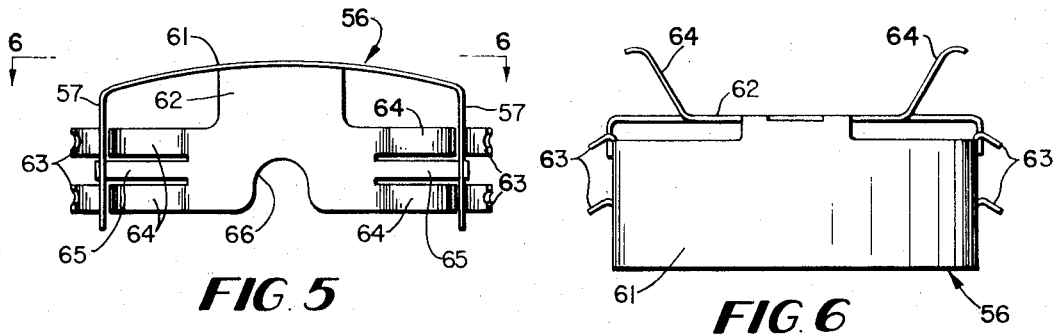
FIG. 5 is an end view of the retaining member for the sensor unit as viewed from the outboard end of the axle.
FIG. 6 is a plan view taken along line 6—6 of FIG. 5.
Figure 7:
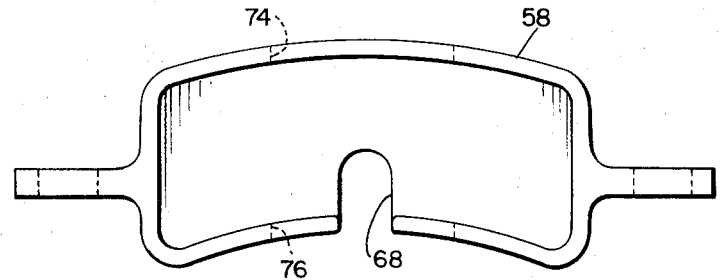
FIG. 7 is an end view of the sensor module housing as viewed from the outboard end of the axle.

As shown in FIGS. 2-4, sensor unit 50 is snugly embraced within a retaining member 56 (FIGS. 5 and 6) and is thereby mounted for inward axial shiftable movement in an arcuate shaped, cast support housing 58 (FIG. 7) fixed to spider 28 and axle flange 30 by bolts 59 and a suitable bracket assembly 60.

Retaining member 56 is a one piece stamping having side walls 57 and an arcuate top 61 generally conforming to the arcuate shape of sensor unit 50, and a rear wall 62.

A plurality of short, realtively stiff clutch fingers 63 are bent outwardly from each of the side walls 57 and extend in the outboard direction of the axle. The ends of fingers 63 frictionally engage the side walls of housing 58 and act as one-way clutch elements in that they permit the member 56 and sensor unit 50 to be shifted axially inwardly in housing 58, but lock these members against any outward axial movement within the housing. The clutch fingers also urge the side walls of the retainer 56 into tight frictional engagement with the sensor 50 and prevent radial and circumferential displacement of the sensor.

A plurality of yieldable arms 64 extend rearwardly from wall 62 to engage the rear wall of housing 58 to prevent undesired inboard displacement of the sensor and assist the clutch fingers 63 in positively frictionally engaging the side walls of housing 58 during operation.

The ends of arms 65 are bent around the rear edge of side walls 57 to prevent flexing of the rear wall 62.

The rear wall 62 has a central slot 66 that aligns with slot 68 in housing 58 to accommodate the electrical cable 52 as the components of sensor module 48 are assembled. As shown in FIGS. 1-4, cable 52 extends rearwardly through slots 66 and 68 out of housing 58 and is fastened in a retainer lug 70 formed integrally on the rear wall of housing 58.

Proper operation of the wheel speed sensing assembly 40 is obtained only if sensor unit 50 is precisely located and maintained with respect to ring 42 so that a predetermined axial clearance or gap is provided between the ring and the magnet poles in the sensor unit. This gap is automatically obtained and maintained by the described sensor assembly and its mounting arrangement.

During manufacture, the components of sensor module 48 are properly assembled together in readiness for mounting on wheel axle 10. This includes placement of a U-shaped locking pin 72 having arms which extend through slots 74 and 76 in the top and bottom walls of housing 58 to establish a initial stop position for the retainer 56 and hence the sensor unit 50. A tag 73 is attached to pin 72 warning personnel not to remove the pin until hub 14 and drum 16 are to be installed on axle 10.

Before assembling the wheel parts, bracket assembly 60 will be fixed on axle 10 and sensor module 48, already preassembled during manufacture, will be mounted on bracket assembly 60 via bolts 59. Sensor unit 50 will be in its outermost outboard position and the outboard radial face of gap pad 54 will lie in a plane substantially perpendicular to the axis of axle 10.

Slinger ring 44 will be connected to flange 20 of wheel hub 14 so that the inboard radial face of rotor ring 42 is in a radial plane which is substantially parallel to the opposing radial face of pad 54.

Before placing wheel hub 14 on axle 10, stop pin 72 is removed from module 48 to permit proper axial adjustment of sensor unit 50. As the wheel hub is then placed on the axle, the inboard face of rotor ring 42 engages the opposing face of gap pad 54 to displace unit 50 and spring member 56 axially inwardly within housing 58, against the light force exerted by arms 64 as they are deflected. When the wheel hub is fully tightened on the axle in the position shown in FIG. 1, magnets 51 within sensor unit 50 and the inboard face of rotor ring 42 will be precisely located with respect to each other and spaced a predetermined axial distance established by the thickness of gap pad 54. This precise relationship is maintained during operation of the vehicle by the clutch fingers 63 which frictionally engage the sidewalls of housing 58 to lock sensor unit 50 against outboard movement. Thus, even though there may be some wear of the gap pad 54 caused by rotation of ring 42, the predetermined gap or clearance between the ring and the magnet poles 51 remains fixed because the unit is locked against outboard movement.

It is apparent that, because of the self-contained construction of sensor module 48 and self-adjusting characteristics of sensor unit 50 within the module, installation of wheel hub 14 on axle 10 is readily facilitated since the precise clearance gap between the rotor and sensor unit required for proper operation of the system is automatically obtained and maintained. Furthermore, because rotor 42 and its support ring 44 may be manufactured by mass production metal stamping techniques, the cost of the sensor assembly is substantially reduced.

Following removal of wheel hub 14 and before reassembly of the hub on axle 10, it is necessary to manually pull sensor unit 50 and retainer 56 outwardly in housing 58 so that the sensor unit may be relocated in its outermost outboard position. Consequently, as the wheel hub is reassembled on the axle, sensor unit 50 and ring 42 are again automatically adjusted to the desired predetermined relationship.

During operation of the vehicle, the components of the sensor assembly 40 are subjected to road shocks and constant vibration which may tend to displace sensor unit 50 inwardly. However the yieldable arms 64 of retainer 56 exert a light but sufficient outward force against sensor unit 50 to counteract the shock and vibration forces and thereby maintain the precise predetermined relationship between unit 50 and rotor 42 required for proper operation.

Sensor unit 50 is effectively shielded against heat, mechanical damage, and dirt by its housing 58 and is further shielded against accumulation of dust by annular dust shield 78 which is fastened to brake spider 28 and extends around the inboard end of brake drum 16. Slinger 44 also assists in protecting sensor unit 50 and additionally directs any excess oil that may leak past the bearing seal 34 to one or more drain openings 80 which extend through hub 14.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by letters Patent is:

1. A wheel speed sensor assembly for installation in association with a wheel rotatably mounted on an axle comprising rotor means adapted to be connected to said wheel for rotation therewith, a magnetic sensor module including a housing adapted to be fixed on said axle, magnetic sensor means, retainer means mounting said sensor means in said housing in operative association with said rotor means, said retainer means permitting inward axial movement of said sensor means in said housing but preventing outward axial movement thereof, whereby said sensor means is automatically adjusted in predetermined relationship with said rotor means in response to axial movement of said rotor means inwardly.

2. The assembly as defined in claim 1, said retainer means comprisng a retainer member embracing said sensor means and slidably mounting said sensor means in said housing, said retainer member having one-way clutch means permitting inward axial movement of said retainer member and sensor means in said housing but preventing outward axial movement thereof.

3. The assembly as defined in claim 2, said housing having side walls and a rear wall, said retainer member including yieldable means engaging the rear wall of said housing and providing an outward biasing force on said sensor means.

4. The assembly as defined in claim 3, said one-way clutch means including a plurality of clutch elements engaging the side walls of said housing and preventing outward axial movement of said retainer and sensor means.

5. The assembly as defined in claim 3, including stop means removably mounted in said housing for establishing an initial position of said retainer means and said sensor means in said housing, said stop means being removed from said housing after said sensor is mounted on said axle and before the wheel is placed thereon.

6. The assembly as defined in claim 1, wherein a layer of dielectric material is provided on the radial surface of said sensor means which faces said rotor means, said layer of dielectric material being engaged by said rotor means when the wheel is mounted on the axle.

7. The assembly as defined in claim 1, wherein said rotor means comprises a stamped metal ring having a plurality of circumferentially spaced slots operatively aligned with said sensor means.

8. A wheel speed sensor assembly for installation in association with a wheel rotatably mounted on an axle comprising a rotor ring adapted to be connected to said wheel for rotation therewith about the axle, a housing adapted to be fixed on said axle, magnetic sensor means, retainer means including a retainer member embracing said sensor means and slidably mounting said sensor means in said housing in operative association with said rotor ring, said retainer member including one-way clutch means which permits inward axial movement of said sensor means in said housing but prevents outward axial movement thereof, said retainer member also including yieldable means providing an outward force on said sensor means, whereby said sensor means is automatically adjusted in predetermined relationship with said rotor means in response to axial movement of said rotor means inwardly and maintained in said predetermined relationship by said one-way clutch means.

9. The assembly as defined in claim 8, said housing having side walls and a rear wall and said yieldable means engaging the rear wall of said housing, said one-way clutch means including a plurality of clutch elements engaging the side walls of said housing and preventing outward axial movement of said sensor means.

10. The assembly as defined in claim 9, including stop means removably mounted in said housing for establishing an initial position of said sensor means in said housing, said stop means being removed from said housing after said sensor means is mounted on said axle and before the wheel is placed thereon.

11. The assembly as defined in claim 8, said sensor means having a layer of dielectric material on its radial surface which faces said rotor ring, said layer of dielectric material being engaged by said rotor ring when the wheel is mounted on the axle thereby automatically adjusting said sensor means and said rotor ring in predetermined relationship.

12. The assembly as defined in claim 8, wherein said rotor ring is formed by a metal stamping operation and includes a plurality of circumferentially spaced slots operatively aligned with said sensor means.

* * * * *